United States Patent
Bennett

(10) Patent No.: US 6,542,651 B2
(45) Date of Patent: *Apr. 1, 2003

(54) APPARATUS AND METHOD FOR ELECTRONIC RIN REDUCTION IN FIBER-OPTIC SENSORS

(75) Inventor: Sidney M. Bennett, Chicago, IL (US)

(73) Assignee: KVH Industries, Inc., Middletown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/034,541

(22) Filed: Dec. 21, 2001

(65) Prior Publication Data

US 2003/0031397 A1 Feb. 13, 2003

Related U.S. Application Data

(63) Continuation of application No. 09/481,159, filed on Jan. 12, 2000, now Pat. No. 6,370,289.

(51) Int. Cl.[7] .................................................. G02B 6/00
(52) U.S. Cl. ........................................ 385/12; 356/350
(58) Field of Search ...................... 385/12, 13; 356/350, 356/460–465, 477

(56) References Cited

U.S. PATENT DOCUMENTS

| | | |
|---|---|---|
| 4,571,650 A | 2/1986 | Ojima et al. |
| 4,603,931 A | 8/1986 | Ruffman |
| 4,615,582 A | 10/1986 | Lefevre et al. |
| 4,630,229 A | 12/1986 | D'Hondt |
| 4,630,890 A | 12/1986 | Ashkin et al. |
| 4,637,722 A | 1/1987 | Kim |
| 4,668,264 A | 5/1987 | Dyott |
| 4,669,814 A | 6/1987 | Dyott |
| 4,697,876 A | 10/1987 | Dyott |
| 4,712,866 A | 12/1987 | Dyott |

(List continued on next page.)

FOREIGN PATENT DOCUMENTS

| | | |
|---|---|---|
| DE | 33 05 104 A1 | 8/1984 |
| DE | 36 15 305 A1 | 11/1987 |
| DE | 37 42 201 A1 | 6/1989 |
| EP | 0 551 874 A2 | 7/1993 |
| EP | 0 586 242 A1 | 3/1994 |
| EP | 0 686 867 A1 | 12/1995 |
| EP | 0 722 081 A2 | 7/1996 |
| EP | 856 737 A1 | 8/1998 |
| EP | 0 871 009 A1 | 10/1998 |
| EP | 0 872 756 A1 | 10/1998 |
| FR | 2 535 463 A | 5/1984 |
| JP | 07209398 | 8/1995 |
| WO | WO98/58268 A | 12/1998 |
| WO | WO00/36425 | 6/2000 |

OTHER PUBLICATIONS

US 6,208,775, 3/2001, Dyott (withdrawn)
Dagenais et al., "Low–Frequency Intensity Noise Reduction for Fiber–Optic Sensor Applications", Optical Fiber Sensors Conference, Jan. 29–31, 1992, pp. 177–180.*

(List continued on next page.)

Primary Examiner—Akm E. Ullah
Assistant Examiner—Michelle R. Connelly-Cushwa
(74) Attorney, Agent, or Firm—Foley Hoag LLP

(57) ABSTRACT

The invention is directed to an apparatus and a method for reducing noise, in particular RIN noise, in optical sensors, in particular fiber-optic sensors. The optical sensor produces a sensor output signal representing a physical quantity to be measured and also contains a first noise component, which is detected by a first detector. A separate detector detects an input light noise component of the input light source of the optical sensor and produces a second noise component. The second noise component is electronically processed and time-delayed or phase shifted by a time delay which substantially correspond to the time delay experienced by the sensor input light traversing the optical sensor. The time-delayed processed signal is then subtracted from the sensor output signal to produce a reduced noise optical sensor signal corresponding to the measured physical quantity.

27 Claims, 11 Drawing Sheets

U.S. PATENT DOCUMENTS

| | | | |
|---|---|---|---|
| 4,733,938 A | 3/1988 | Lefevre et al. | |
| 4,740,085 A | 4/1988 | Lim | |
| 4,755,021 A | 7/1988 | Dyott | |
| 4,765,739 A | 8/1988 | Koizumi et al. | |
| 4,776,700 A | 10/1988 | Frigo | |
| 4,796,993 A | 1/1989 | Sonobe et al. | |
| 4,815,817 A | 3/1989 | Levinson | |
| 4,842,409 A | 6/1989 | Arditty et al. | |
| 4,848,910 A | 7/1989 | Dupraz | |
| 4,883,358 A | 11/1989 | Okada | |
| 4,887,900 A | 12/1989 | Hall | |
| 4,943,132 A | 7/1990 | Huang | |
| 5,033,854 A | 7/1991 | Matthews et al. | |
| 5,048,962 A | 9/1991 | Kurokawa et al. | |
| 5,074,665 A | 12/1991 | Huang et al. | |
| 5,080,489 A | 1/1992 | Nishikawa et al. | |
| 5,106,193 A | 4/1992 | Fesler et al. | |
| 5,133,600 A | 7/1992 | Schröder | |
| 5,135,555 A | 8/1992 | Coyle, Jr. et al. | |
| 5,289,257 A | 2/1994 | Kurokawa et al. | |
| 5,289,258 A | 2/1994 | Szafraniec et al. | |
| 5,331,404 A * | 7/1994 | Moeller et al. | 356/460 |
| 5,351,123 A | 9/1994 | Spahlinger | |
| 5,359,413 A | 10/1994 | Chang et al. | |
| 5,365,338 A | 11/1994 | Bramson | |
| 5,412,471 A | 5/1995 | Tada et al. | |
| 5,459,575 A | 10/1995 | Malvern | |
| 5,469,257 A * | 11/1995 | Blake et al. | 356/464 |
| 5,469,267 A | 11/1995 | Wang | |
| 5,471,301 A | 11/1995 | Kumagai et al. | |
| 5,493,396 A | 2/1996 | Sewell | |
| 5,500,909 A | 3/1996 | Meier | |
| 5,504,684 A | 4/1996 | Lau et al. | |
| 5,552,887 A | 9/1996 | Dyott | |
| 5,559,908 A | 9/1996 | August et al. | |
| 5,654,906 A | 8/1997 | Youngquist | |
| 5,655,035 A * | 8/1997 | Burmenko | 356/460 |
| 5,682,241 A | 10/1997 | Mark et al. | |
| 5,701,177 A | 12/1997 | Kumagai et al. | |
| 5,701,376 A | 12/1997 | Shirasaki | |
| 5,767,509 A | 6/1998 | Cardova et al. | |
| 5,781,675 A | 7/1998 | Tseng et al. | |
| 5,854,864 A | 12/1998 | Knoesen et al. | |
| 5,898,496 A | 4/1999 | Huang et al. | 356/350 |
| 5,946,097 A | 8/1999 | Sanders et al. | |
| 5,987,195 A | 11/1999 | Blake | |
| 6,023,331 A | 2/2000 | Blake et al. | |
| 6,025,915 A | 2/2000 | Michal et al. | |
| 6,047,095 A | 4/2000 | Knoesen et al. | |
| 6,075,915 A | 6/2000 | Koops et al. | |
| 6,148,131 A | 11/2000 | Geertman | |
| 6,163,632 A | 12/2000 | Rickman et al. | |
| 6,185,033 B1 | 2/2001 | Bose et al. | |
| 6,233,371 B1 | 5/2001 | Kim et al. | |
| 6,301,400 B1 | 10/2001 | Sanders | |
| 6,351,310 B1 | 2/2002 | Emge et al. | |

OTHER PUBLICATIONS

Clark et al., "Application of a PLL and ALL Noise Reduction Process in Optical Sensing System", IEEE Transactions on Industrial Electronics, vol. 44, No. 1, Feb. 1997, pp. 136–138.*

Blake et al., "In–Line Sagnac Interferometer Current Sensor," *IEEE*, pp. 116–121 (1995).

Bohnert. et al., "Field Test of Interferometric Optical Fiber High–Voltage and Current Sensors" *SPIE*, vol. 2360 pp. 16–19 (Feb. 1994).

Bohnert. et al., "Temperature and Vibration Insensitive Fiber–Optic Current Sensor" *ABB*, vol. 2360 pp 336–339 (Feb. 1994).

Dupraz, J.P., "Fiber–Optic Interferometers for Current Measurement: Principles and Technology", Alsthom Review No. 9: 29–44 (Dec. 1987).

Frosio, G. and Dändliker, "Reciprocal Reflection Interferometer for a Fiber–Optic Faraday Current Sensor", Applied Optics 33 (25): 6111–6122 (Sep. 1, 1994).

Gronau Yuval et al.; "Digital Signal Processing For An Open–Loop Fiber–Optic Gyroscope", Applied Optics, Optical Society of America, Washington, U.S., vol. 34, No. 25, Sep. 1, 1995, pp. 5849–5853.

LaViolette and Bossler: "Phase Modulation Control for An Interferometric Fiber Optic Gyroscope", IEEE Plan 90, Position Location and Navigation Symposium, Las Vegas, (Mar. 20–23, 1990).

McCallion and Shimazu; "Side–Polished Fiber Provides Functionality and Transparency", Laser Focus World, 34 (9): S19–S24, (Sep. 1, 1998).

Nikos Drakos, "Circular Polarization States for Light, and Quarter–Wave Plates," *Computer Based Learning Unit, University of Leeds* (Mar. 2, 1998).

Ono et al.; "A Small–Sized, Compact, Open–loop Fibre–Optic Gyroscope with Stabilized Scale Factor", Meas. Sci. Technol. 1: 1078–1083, 1990.

Short, S. et al., "Elimination of Birefringence Induced Scale Factor Errors in the In–Line Sagnac Interferometer Current Sensor", Journal of Lightwave Technology 16 (10): 1844–1850 (Oct. 1998).

Alekseev et al; "Fiber Optic Gyroscope With Suppression of Excess Noise From the Radiation Source", Technical Physical Letters, 24(9): 719–721, (Sep. 1998).

Blake and Szafraniec, "Random Noise in PM and Depolarized Fiber Gyros", OSA Symposium Proceedings, 1997, OWB2, pp. 122–125.

Burns, Moeller and Dandridge, "Excess Noise in Fiber Gyroscope Sources", IEEE Photonics Technology Letter, vol. 2, No. 8, Aug. 1990, pp. 606–608.

International Search Report Completed on Jul. 9, 2001 and Mailed on Jul. 16, 2001.

Killian m. Kevin; "Pointing Grade Fiber Optic Gyroscope", IEEE AES Systems Magazine, Jul. 1994.

Lefevre, "The Fiber–Optic Gyroscope", Artech House, Boston 1993. Only Table of Contents was provided and considered.

Moeller and Burns, "1.06mm All–fiber Gyroscope with Noise Subtraction, Proceedings of the Conference on Optical Fiber Sensors", IEEE–OSA, Monterey, CA, 1992, pp. 82–85.

Moeller and Burns, "Observation of Thermal Noise in a Dynamically Biased Fiber–Optic Gyro", Optical Letters, 1996, vol. 21, pp. 171–173.

Polynkin et al.; "All–Optical Noise–Subtraction Scheme for a Fiber–Optic Gyroscope", Optics Letters, 25(3):147–149, (Feb. 1, 2000).

Rabelo et al.; "SNR Enhancement of Intensity Noise–Limited FOGs", Journal of Lightwave Technology 18(12):2146–2150 (Dec. 2000).

* cited by examiner

APPARATUS AND METHOD FOR ELECTRONIC RIN REDUCTION IN FIBER-OPTIC SENSORS

RELATED APPLICATIONS

This application is a con of, and incorporates by reference, the entire disclosure of U.S. patent application Ser. No. 09/481,159, filed on Jan. 12, 2000 now U.S. Pat. No. 6,370,289.

FIELD OF THE INVENTION

The invention relates to fiber-optic sensors, in particular fiber-optic gyroscopes and fiber-optic sensors that measure magnetic fields.

BACKGROUND OF THE INVENTION

Fiber-optic sensors can be used to measure various physical quantities, such as the rotation of an object (referred to as fiber-optic gyroscope) or magnetic fields arising from currents in the vicinity of the sensor (referred to as fiber-optic current sensor). Such fiber-optic sensors typically include a section of optical fiber that is coupled to a broadband source, such as a laser operated below threshold, a superluminescent diode (SLD) or a fiber superluminescent source, a coupler to couple optical radiation emitted by the broadband source into the fiber, preferably a fiber coil, at least one polarizer and at least one phase modulator, and a detector which detects a phase shift or polarization difference between the optical signals traversing the fiber. The phase or polarization shift between the optical signals may be introduced, for example, by the rotation of the fiber coil or by a magnetic field. The terms fiber-optic sensor and gyro will be used interchangeably hereinafter to refer to both fiber-optic gyroscopes and fiber-optic current sensors.

The electrical output signal of a fiber-optic sensor includes noise components arising from various sources. The output noise which tends to manifest itself as angular random walk (ARW), as defined, for example, in IEEE Std-528, Inertial Sensor Terminology (incorporated by reference herein), has a different functional dependence on the optical power at the photodetector input, depending on the origin of the noise component. For example, thermal noise generated in the transimpedance amplifier feedback resistor in the photodetector electronics is independent of the light power. Shot noise related to the quantized nature of the detector current can be shown to be proportional the square root of optical power, whereas relative intensity noise (RIN), which is inherent in the light of the source due to its finite bandwidth and impinges on the photodetector and flicker noise (1/f), is proportional to the optical power. Since RIN and flicker noise have the same functional dependence on optical power, the term RIN hereinafter refers to both RIN and flicker noise.

The RIN causes the noise-related performance of the fiber-optic sensor systems to saturate, rather than continue to improve, as the source power is increased. Unless the RIN can be mitigated, there exists a power level beyond which no further practical improvement is possible. For example, EDFS (Erbium doped fiber sources) which, due to their high optical power and wavelength stability, are often considered the natural choice for high performance fiber-optic sensors, tend to have a high RIN. Superluminescent diodes (SLD's), on the other hand, tend to have a lower RIN due to their larger bandwidth, but may suffer from limitations in power and lifetime, limiting their utility.

In one approach described in U.S. Pat. No. 5,331,404 and illustrated in FIG. 11, RIN in fiber-optic sensors is reduced by coupling a fraction of the light emitted by a light source 19 into a "dummy" fiber 30 having substantially the same length as the fiber 22 of the fiber-optic sensor 5. The output signal detected at the end of the "dummy" fiber 30 by detector 34 is then modulated in multiplier 36 by a replica of the signal output of the fiber optic sensor 5 detected by detector 32 and subtracted in subtractor 38 from the output signal of the fiber-optic sensor 5 detected by detector 32 after passing through AC coupled amplifiers 40, 42 with suitable adjustment of the channel gains. In other words, the "dummy" fiber 30 in this case operates as an analog delay line to match the time delay experienced by the light traversing the fiber-optic sensor 5. This approach, however, requires a second coil of fiber of approximately the same length as the fiber-optic sensor coil.

In another approach disclosed in U.S. Pat. No. 5,655,035, two fiber-optic sensors can be excited by the same optical source, but with the sensitive axes oriented in diametrically opposed directions. The detected outputs are added, thereby subtracting the RIN, which is common to both channels since it arises in the common source. This approach doubles the entire fiber-optic sensor optical component count (except for the light source), which is expensive and bulky.

It would therefore be desirable to provide a fiber-optic sensor that does not add weight and complexity, while at the same time eliminating or at least reducing the RIN noise component.

SUMMARY OF THE INVENTION

The invention is directed to an apparatus and a method for reducing noise, in particular RIN noise, in fiber-optic sensors.

According to one aspect of the invention, a fiber-optic sensor system includes a light source producing a sensor input light, and a fiber-optic sensor receiving the sensor input light and adapted to measure a physical quantity. The fiber-optic sensor produces a sensor output signal which includes the physical quantity and a first noise component, which is detected by a first detector. A second detector detects the sensor input light produced by the light source which includes a second noise component. An electronic processor is coupled to the first and second detectors and includes a delay circuit which applies an electronic time delay to the second noise component, wherein the electronic time delay substantially corresponds to a time delay of the sensor input light traversing the fiber-optic sensor. The electronic processor further includes a multiplier, which multiplies the time-delayed second noise component with the sensor output signal and a subtractor which subtracts the multiplied time-delayed second noise component from the sensor output signal to produce the fiber-optic sensor signal having the reduced noise.

According to another aspect of the invention, a method is provided for producing a measurement signal having reduced noise from a fiber-optic sensor. The method includes measuring a sensor output signal containing the measurement signal and a first noise component and measuring an input light noise component of fiber-optic sensor input light representing a second noise component. The second noise component is electronically time-delayed, wherein the time delay substantially corresponds to a sensor time delay of the sensor input light traversing the fiber-optic sensor. The time-delayed second noise component is then multiplied with the sensor output signal and the multiplied second noise component is subtracted from the sensor output signal to produce the reduced noise measurement signal.

According to yet another aspect of the invention, a method is provided for producing a measurement signal having reduced noise from a fiber-optic sensor. The method includes measuring a sensor output signal containing the measurement signal and a first noise component and measuring an input light noise component of fiber-optic sensor input light representing a second noise component. The second noise component is multiplied with the sensor signal and the sensor output signal and the multiplied second noise component are transformed into the frequency domain. At least one of an amplitude and a phase of the transformed multiplied noise signal is adjusted relative to a respective amplitude and phase of the transformed sensor output signal, so that the relative phase shift corresponds to the sensor time delay. The multiplied second noise component is subtracted from the sensor output signal to produce the reduced noise measurement signal.

According to still another aspect of the invention, an optical sensor system for producing a sensor signal having reduced noise includes a light source producing a sensor input light and an optical sensor which receives the sensor input light and is adapted to measure a physical quantity, with the optical sensor producing a sensor output signal comprising the physical quantity and a first noise component. A first detector detects the sensor output signal, whereas a second detector detects the sensor input light comprising a second noise component. An electronic processor is coupled to the first and second detector and electronically time-delays the second noise component with respect to the sensor output signal, with the electronic time delay substantially corresponding to a time delay of the sensor input light traversing the fiber-optic sensor. The processor subtracts a modulated signal, which is a function of the multiplied time-delayed second noise component, from the sensor output signal to produce the sensor signal having the reduced noise.

Embodiments of the invention may include one or more of the following features. The measured physical quantity may be a rotation of the fiber-optic sensor or a magnetic field which may be produced by an electric current. The second detector which detects the input light noise component, may be coupled to an input section of the fiber-optic sensor, or may be coupled directly to the light source which produces the fiber-optic sensor input light. The electronic processor may include a multi-channel sample-and-hold device and an electronic delay unit which electronically time-shifts the sampled second noise component relative to the sampled sensor output signal by a time period which substantially corresponds to the sensor time delay of the sensor input light traversing said fiber-optic sensor. Alternatively, the processor may include a transform processor, such as a Fourier-transform processor performing discrete Fourier transforms, which transforms the sensor output signal and the modulated noise signal into the frequency domain. A spectral weighting function may be applied to the transformed sensor output signal and the second noise component. The relative amplitude and phase may be determined by comparing the sensor output signal and the second noise component in a spectral region where no measurement signal is produced by the fiber-optic sensor. The relative gain of the sensor output signal and/or the second noise component may be adjusted, for example, by setting the relative gain correction equal to the ratio of the noise powers of the sensor output signal and the second noise component.

Further features and advantages of the present invention will be apparent from the following description of certain embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to an apparatus and a method for reducing noise, in particular RIN noise, in a fiber-optic sensor. In particular, the noise reduction system and method described herein can reduce RIN noise without the need for additional bulky fiber-optic components. The fiber-optic sensor of the present application uses a first detector to measure an output signal of a fiber-optic sensor and a second detector to measure a second signal which has not traversed the sensor optical path and represents a signature of the light source. The second signal is electronically delayed with respect to the first signal and modulated by a replica of the sensor signal and subtracted from the first signal after suitable amplification.

Figure 1:
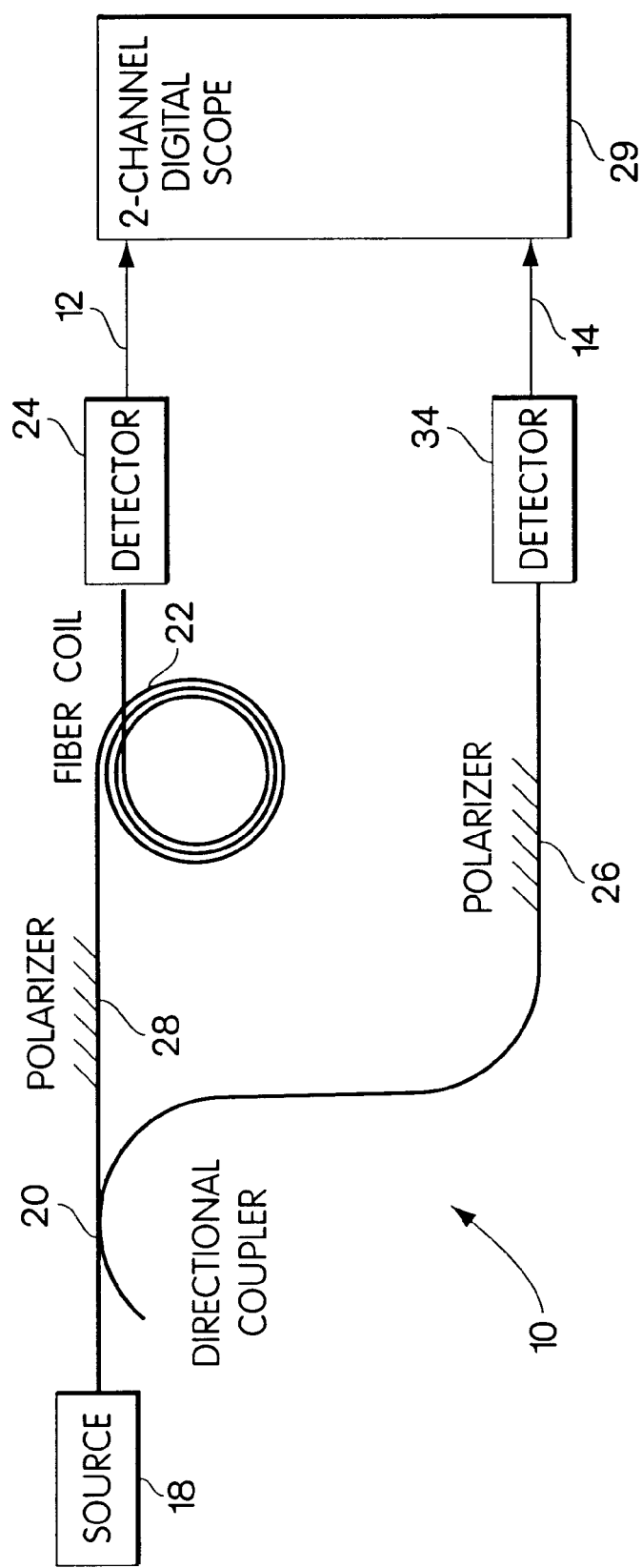
FIG. 1 is an experimental setup for measuring a non-delayed signal and a signal delayed by a fiber coil.

Referring first to FIG. 1, a fiber-optic sensor 10 includes a light source 18, which may be a broad-spectrum superluminescent source (SLS) exhibiting superluminescence or superfluorescence, as has been observed in high-gain laser materials which are operated below lasing threshold or as essentially single-pass amplifiers of spontaneous photons without the use of an optical resonator. One example of an SLS is a superluminescent diode (SLD). Alternatively, a superluminescent fiber source (SFS) may be employed which has an improved temperature stability over a semiconductor SLS. In addition, the available power in an SFS is significantly higher than that of a SLD. The light source 18 may be polarized or unpolarized.

The light source 18 is coupled to an input coupler 20 which is implemented as a directional coupler. A first portion of the light emerging from the input coupler 20 is transmitted through a first polarizer 28, for example, a fiber polarizer of the type described in U.S. Pat. No. 5,739,944 to Dyott, to a fiber coil 22, such as a coil of a fiber-optic sensor, which may have a length of several meters to several kilometers and may consist of polarization-maintaining fiber or conventional single mode fiber. It will be appreciated by those skilled in the art that the fiber coil 22 is only representative of an optical waveguide configuration and that other optical waveguides, such as integrated waveguide structures, for example thin film waveguides formed on a suitable substrate, may be used instead of or in addition to the optical fiber of the fiber coil 22. The output signal of the fiber coil 22 is detected by a first detector 24, which may be a conventional p-n or avalanche photodetector, and inputted at a first input channel 12 of a multi-channel digital scope 29 or another suitable signal processor capable of time-resolving an electrical input signal.

A second portion of the light emerging from the input coupler 20 is transmitted through a second polarizer 26 having a polarization axis substantially parallel to that of the first polarizer 28 and detected by a second detector 34. The polarizers 26, 28 may be implemented as fiber polarizers, polarizing fiber or in an integrated optics circuit which incorporates one or more of the above optical components. The polarizers 26, 28 select the same polarization in each of the paths. The signal detected by the second detector 34 is inputted at a second input channel 14 of the multi-channel digital scope 29. The input channels may also include variable gain amplifiers, as is known in the art.

Figure 2A:
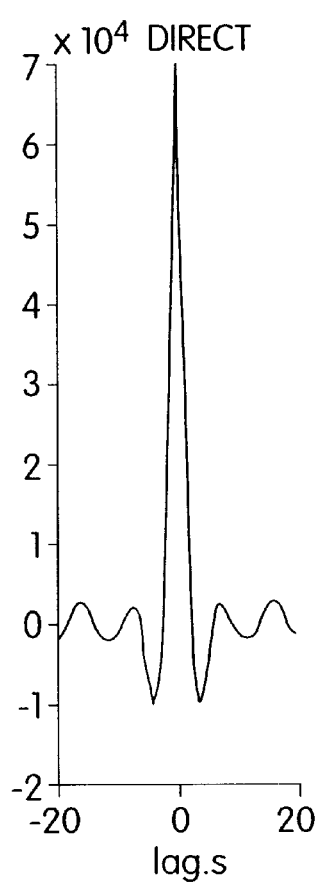
FIG. 2 shows the delayed and non-delayed signals of FIG. 1 and a correlated signal.
Figure 2B:
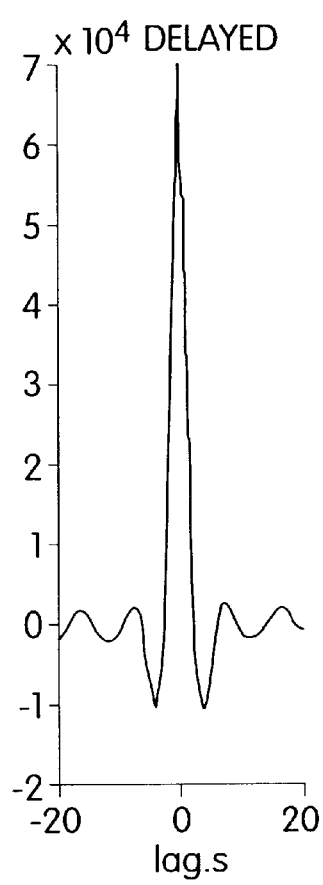
Figure 2C:
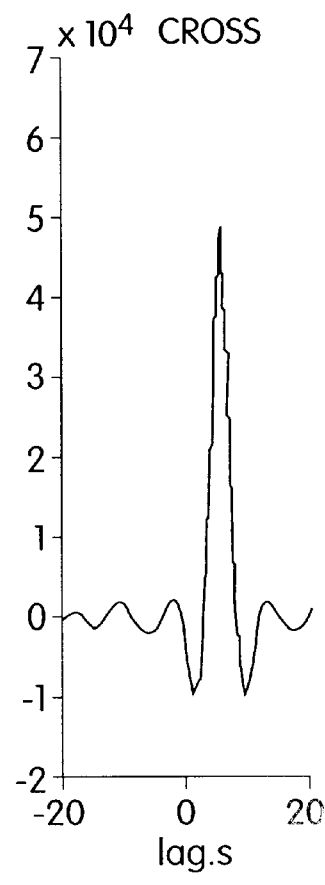

Referring now to FIGS. 2A–2C, the auto-covariance of detector 34 is shown in FIG. 2A and the auto-covariance of detector 24 is shown in FIG. 2B. FIG. 2B represents the auto-covariance of the delayed signal, i.e., of the signal traversing the fiber coil 22. The test was conducted using a SLD as the source 18, yielding a detected power of approximately 20 microwatts at each of the detectors 24, 34. In this example, the amplification of the input channels 12, 14 of the digital scope 29 is adjusted so that the displayed signals have equal amplitude.

FIG. 2C shows the cross-covariance between the amplified input signal at input channel 12 and the amplified input signal at input channel 14. The signal that is present in both of the channels has a maximum cross-covariance when delayed by 6 sampling units (lags), which at the exemplary sample rate used is equivalent to approximately 1.2 microseconds, which is approximately equal to the expected propagation delay in the exemplary 200 meter fiber-optic coil 22. Thus we can conclude that the RIN noise passes through a PM fiber coil without distortion, and that a digital delay will be effective in subtracting the RIN.

The maximum value of the cross covariance is less than either of the two individual signals, since the signals, in addition to RIN, contain thermal and shot noise which are truly random and should not be correlated between the two channels. The effectiveness of the cancellation achieved will depend on the quality of the matching of the phase and amplitude of the two channels.

Figure 3:
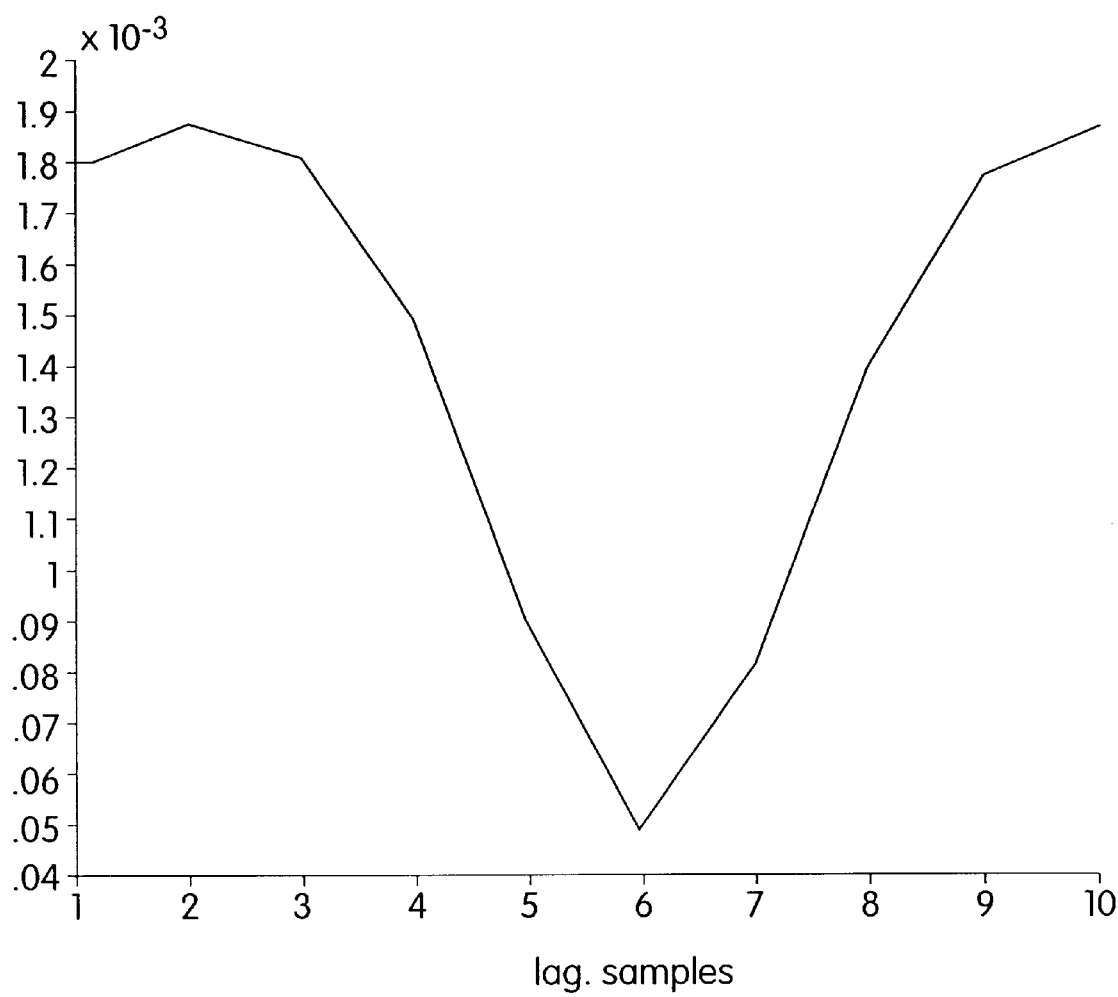
FIG. 3 shows a difference signal between the delayed and non-delayed signals of FIG. 1.

FIG. 3 illustrates the effectiveness of correlating the delayed signal measured with detector 34 with the output signal of the fiber coil 22 measured with detector 24 to reduce RIN noise. The direct waveform which provided the auto-covariance shown in FIG. 2A was subtracted from the delayed waveform which provided the auto-covariance shown in FIG. 2B, and the remaining power was computed as a function of delay (lag). The result is shown in FIG. 3. The minimum power is observed at a lag of about 6, equivalent to 1.2 microseconds, which is consistent with the time delay expected for the exemplary 200 m fiber coil 22. Since the direct waveform and the delayed waveform add in an incoherent manner when RIN is not cancelled, the attained reduction in RIN noise should actually be compared with the power levels at half the maximum power. On this basis, approximately 50 percent of the noise was cancelled. RIN noise cancellation could be improved further by providing a better match between the respective transfer functions of the detectors/amplifiers 24, 12 and 34, 14. If the power of the source were increased, the proportion of the total noise attributable to RIN would increase, and the overall ability to reduce noise by this techniques would be enhanced. The experimental results shown in FIGS. 2 and 3 demonstrate that RIN noise can be substantially reduced by subtracting a time-delayed source reference signal from the signal detected after the light has traversed the fiber coil 22. Based on this inventive concept, various embodiments of an apparatus for reducing RIN noise are illustrated in FIGS. 4–10.

Figure 4:
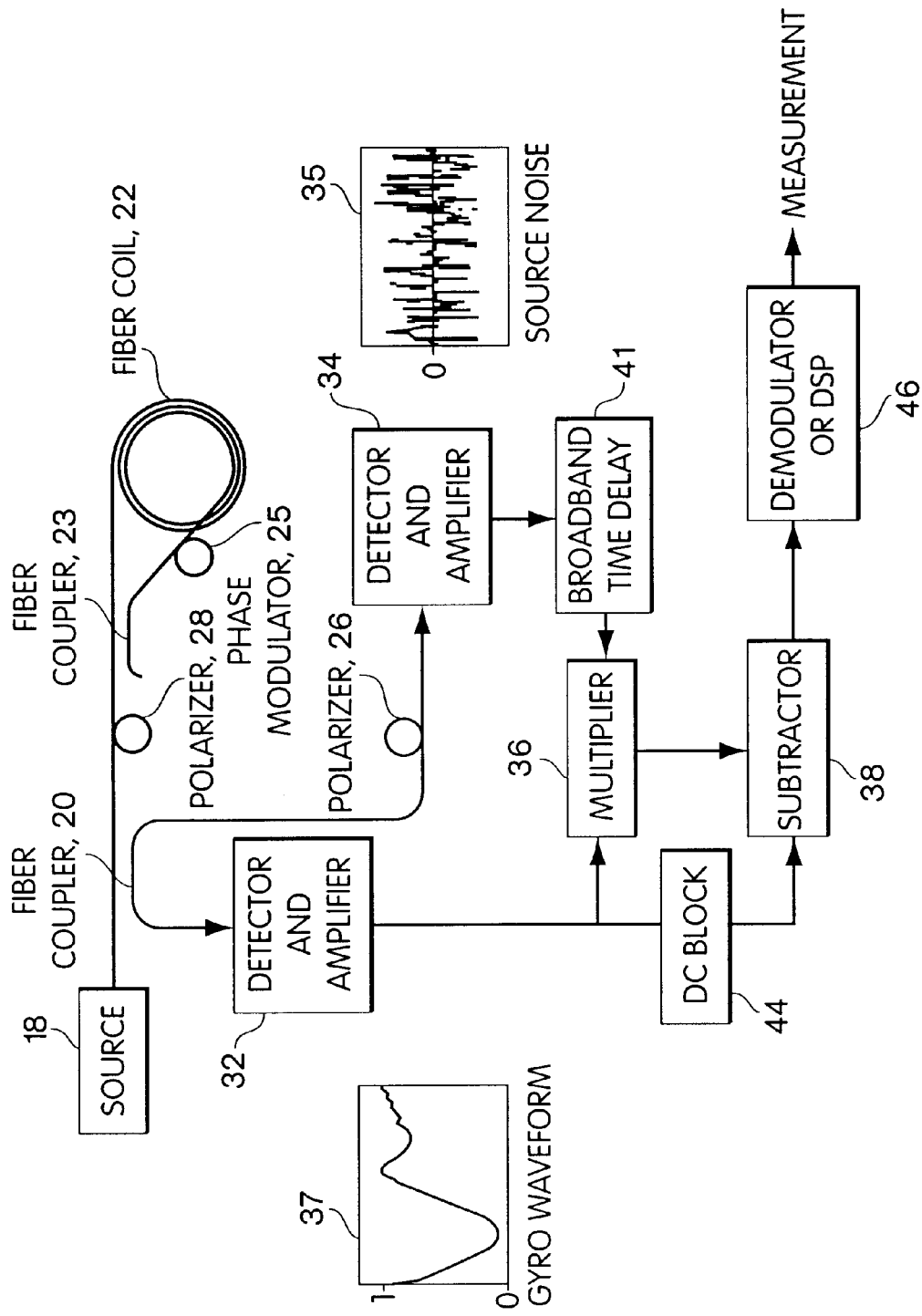
FIG. 4 shows a first embodiment of the fiber-optic sensor system according to the invention.

Referring now to FIG. 4, in a first embodiment light from a light source 18 is coupled into an input coupler 20, with a first portion of the light emerging from the input coupler 20 being transmitted through a first polarizer 28 to a second coupler 23 which launches two counter-propagating light beams circularly polarized in opposite directions into the respective ends of the fiber coil 22. The phase of these counter-propagating light beams is modulated by phase modulator 25 when the respective counter-propagating light beams enter the fiber coil at the respective coil ends. A detector and amplifier 32 is coupled to a return tap of fiber coupler 20 and measures the optical power of the interference light produced by an interference of the counter-propagating light beams combined in fiber coupler 23. The interference light includes, in addition to the desired gyro signal, among others, the RIN noise.

A second portion of the light emerging from the unused tap of input coupler 20 is transmitted through a second polarizer 26 having a polarization axis substantially parallel to that of the first polarizer 28 and detected by a second detector and amplifier 34. This detected second portion 35 of the light represents the RIN noise as well as the other incoherent noise sources mentioned above. The other noise sources are not included in the present discussion. The RIN (source noise) sample 35 is delayed in a delay unit 41 whose bandwidth is larger than the detector bandwidth, so that the time delay is essentially constant across the bandwidth where noise cancellation is desired and the gyro signal is present. The delay unit 41 can be either analog delay line or implemented digitally in a shift register or in a computer memory buffer. The RIN noise sample 35 is then multiplied in multiplier 36 by the waveform 37 of the signal returned to the photodetcctor 32. The gyro waveform can also be passed through a DC block 44 to eliminate the DC component of the gyro signal prior to the subtraction operation. The multiplied RIN noise sample 35 is then subtracted from the fiber-optic sensor signal in subtractor 38. The gyro signal, however, has so far not been modified and can be processed by various conventional open or closed-loop processing methods known in the art. To improve the degree of cancellation, the gain of the two signal paths should be matched, taking into consideration losses in the gyro optical circuit. Generally, this can be done by comparing the noise powers in a frequency range that does not contain the gyro signal and then setting the noise powers in the two channels to be equal by adjusting the gain of detectors and amplifiers 32, 34. If phase information of the signal is also required, then the comparison could be done as a cross spectrum. The resulting time-dependent waveform having a reduced RIN component can then be processed further, for example, in a demodulator or digital signal processor 46 in a manner identical to that of a fiberoptic sensor signal that had not been subject to RIN cancellation.

Figure 5:
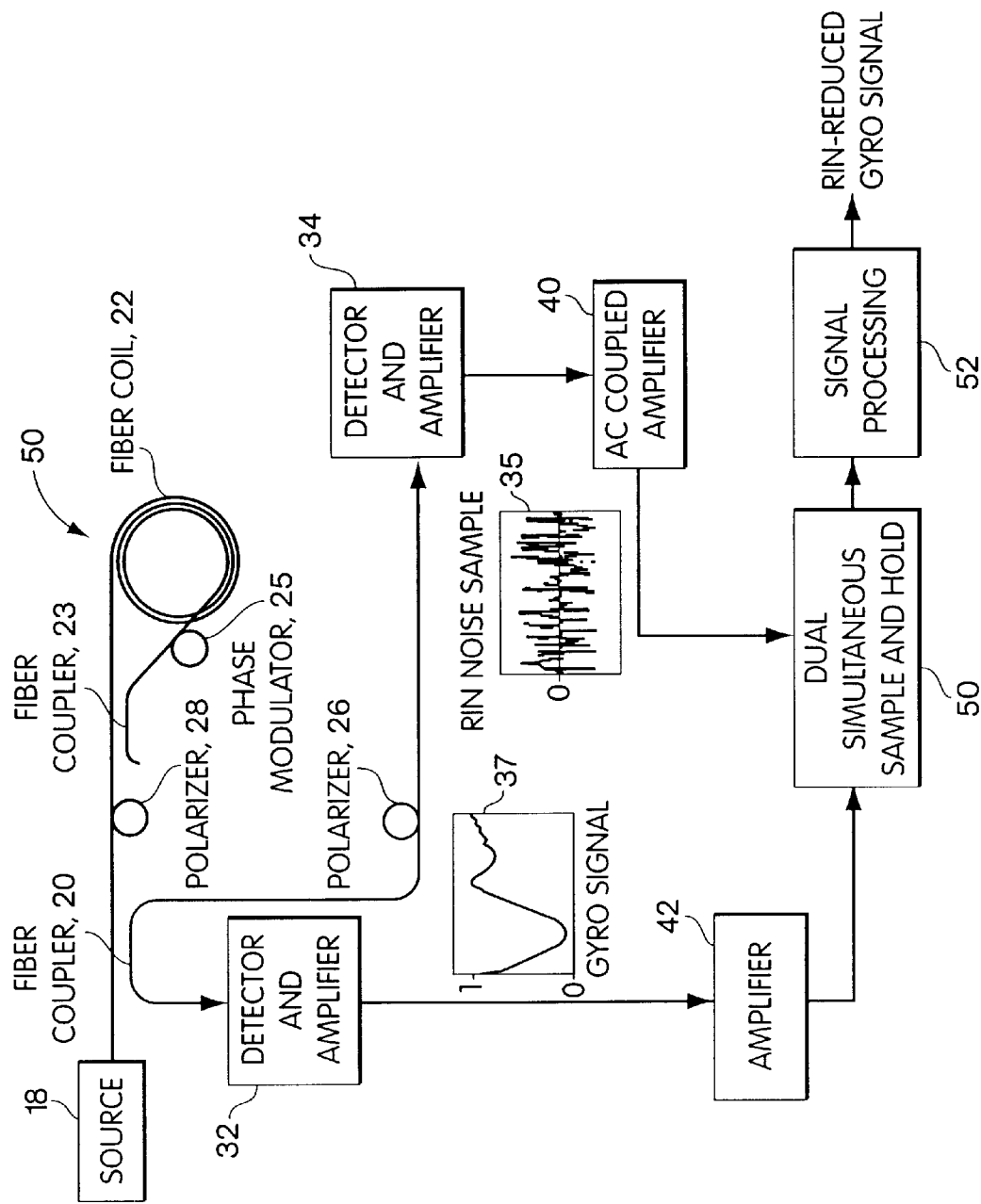
FIG. 5 shows a second embodiment of the fiber-optic sensor system according to the invention.

In a second embodiment illustrated in FIG. 5, the operations described above are performed using digital signal processing technology. Both the gyro signal at the output of the fiber-optic sensor detector 32 and RIN noise sample signal at the output of the detector 34 are here sampled simultaneously, for example, by a multi-channel sample-and-hold (S/H) amplifier 50, which may include an A/D converter. The sampling rate is chosen so that valid Nyquist rate samples are obtained for the entire detector bandwidth. Errors introduced by non-simultaneous sampling at the same sample rate can also be minimized by selecting a high sampling rate. The signals are sampled at discrete sample intervals, for example, 0.2 microseconds, corresponding to a sample frequency of 5 MHz. The sample of the RIN noise 35 detected at detector 34 has not traversed the fiber-optic sensor and thus represents at each sampling point the noise at a time that is earlier than the noise content of the fiber-optic sensor signal 37 detected at detector 32, which has a time shift equal to the physical time delay in the fiber-optic sensor. The sampled gyro signal 37 and RIN noise sample 35 are then processed in signal processing unit 52, which will now be described in detail.

Figure 6:
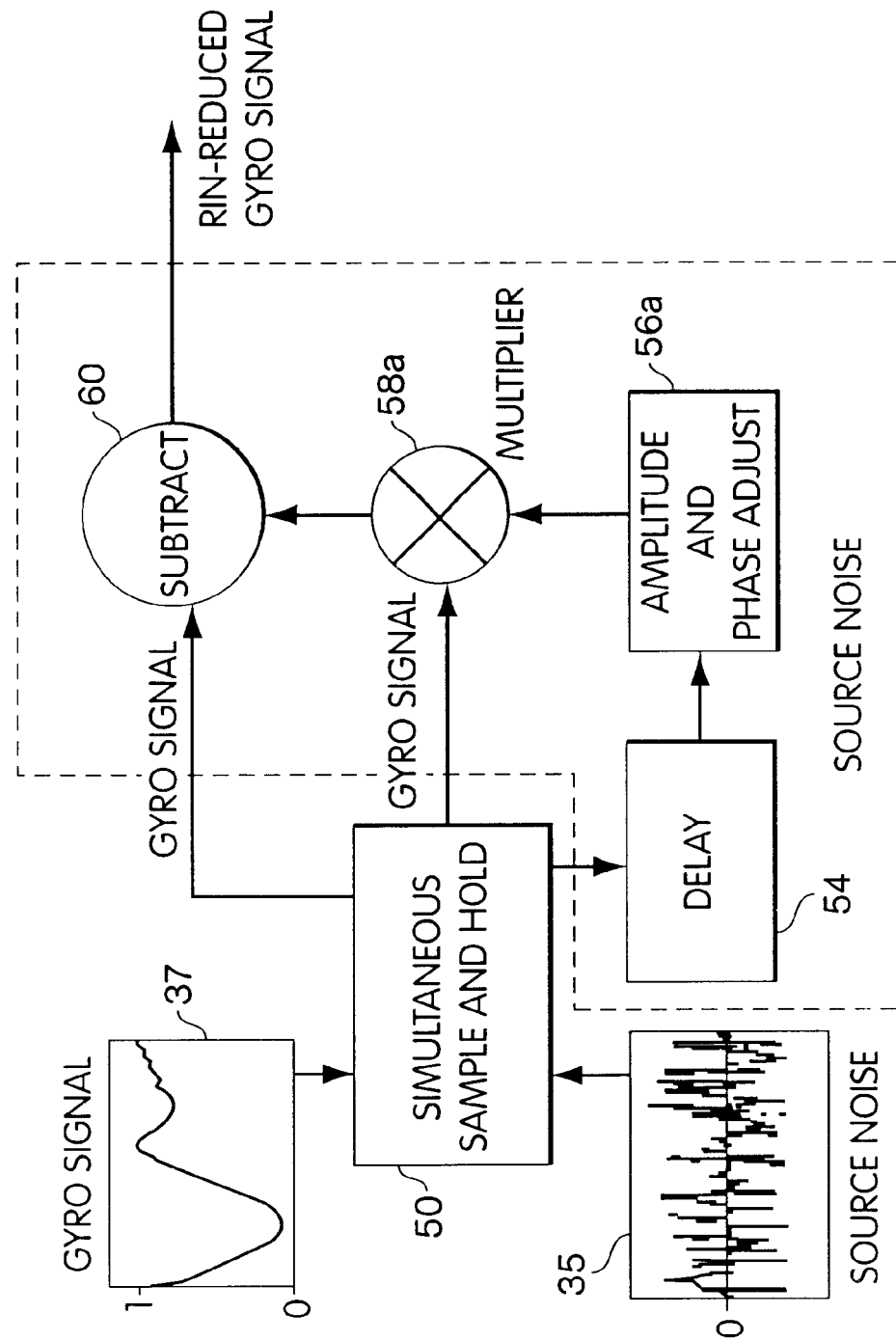
FIG. 6 shows a first embodiment of the signal processing circuit of FIG. 5.
Figure 7:
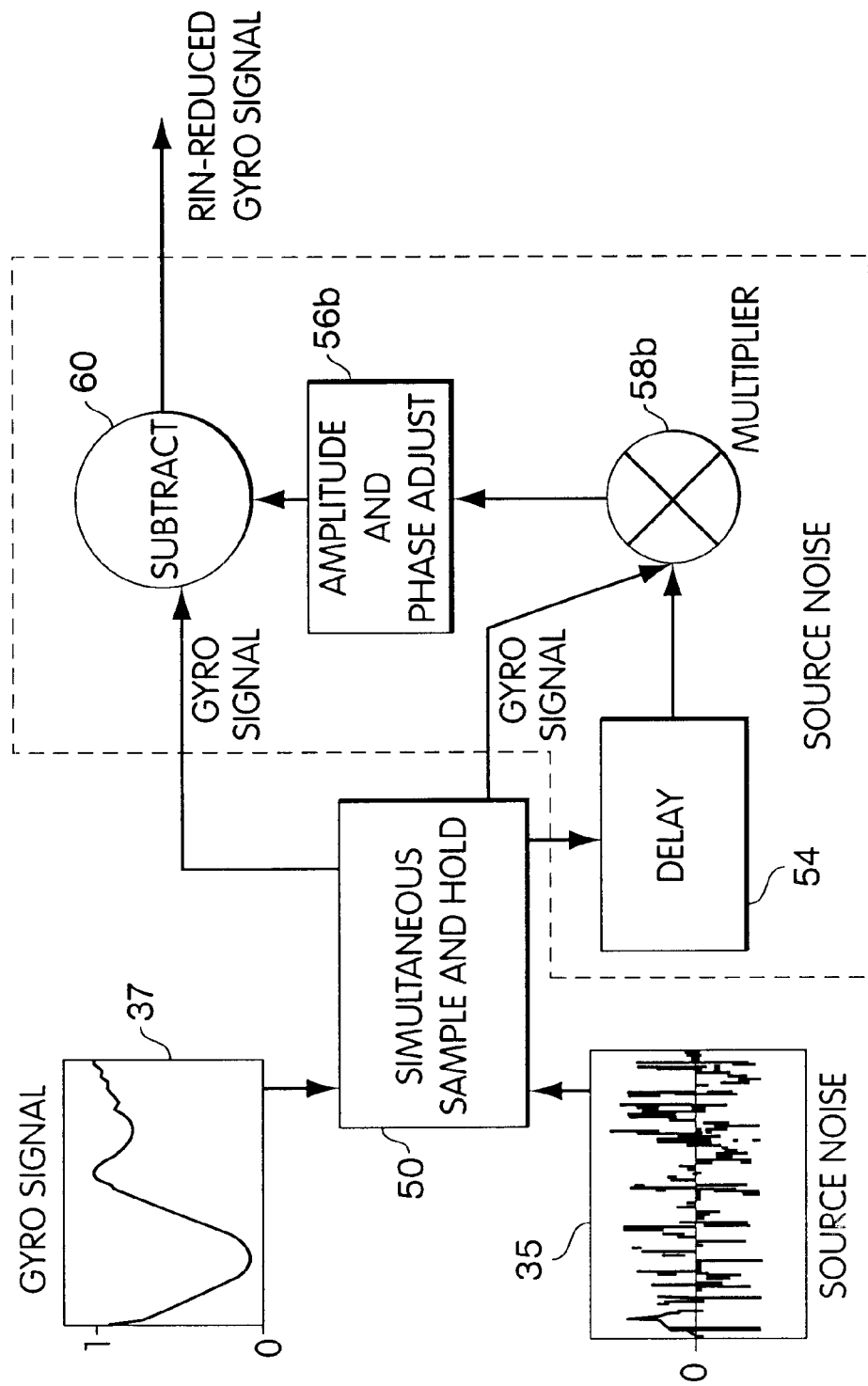
FIG. 7 shows a second embodiment of the signal processing circuit of FIG. 5.
Figure 8:
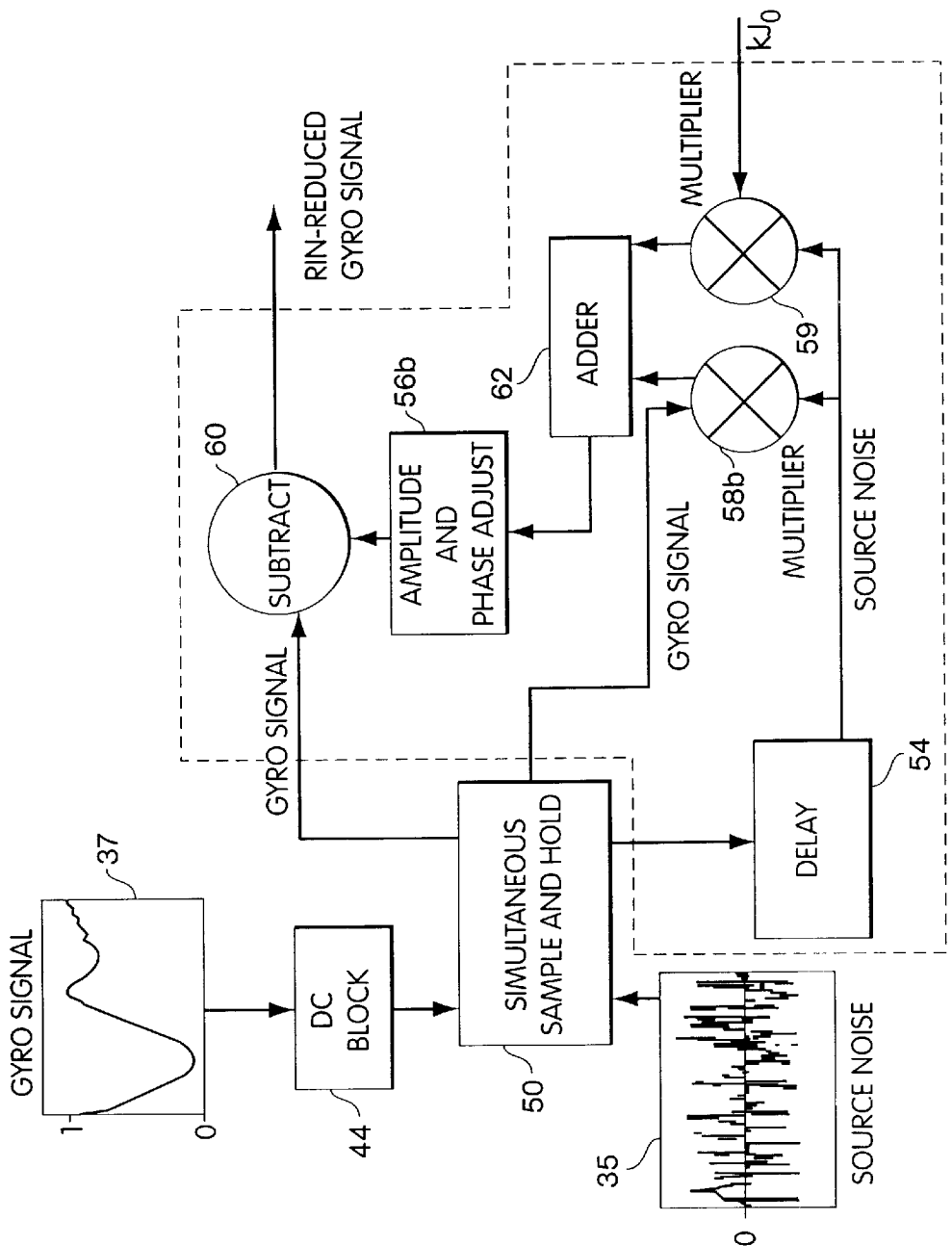
FIG. 8 shows a third embodiment of the signal processing circuit of FIG. 5.

Referring now to FIGS. 6–8, three embodiments of the signal processing unit 52 are shown which provide time delay and amplitude and phase adjustment of the RIN noise sample 35 to subtract the RIN noise from the gyro signal to produce a RIN-reduced gyro signal. A first embodiment 52a of the signal processing unit 52 is illustrated in FIG. 6. The undelayed RIN sample 35 is delayed in a digital delay unit 54 by an integral number of digital sample times with respect to the gyro data 37 such that the delay of the sampled RIN noise 35 becomes substantially equal to that experienced by the fiber-optic sensor signal 37. If the time delay of the light in the gyro coil is equal to an integral number of sample times, then the two signals will be exactly aligned. However, since the RIN sample is a slowly varying function of the sample time, the RIN noise is still substantially reduced even if the time delay is not equal to an integral number of sample times. The digital delay unit 54 may be implemented as a circular buffer, but other means, such as a shift register, may also be employed. The amplitude and, if desired, also the phase of the delayed RIN noise signal 35 are then adjusted in variable gain amplifier 56a and the amplified/phase-shifted signal is multiplied by the gyro signal 37 in multiplier 58a. The output signal of multiplier 58a is then subtracted from the gyro signal 37 in subtractor 60, producing the desired RIN-reduced gyro signal.

In another embodiment 52b illustrated in FIG. 7, the delayed RIN sample data 35 is first multiplied by the gyro signal 37 in multiplier 58b, before the amplitude (and phase) are adjusted in variable gain amplifier 56b. The output signal of gain amplifier 56b is then subtracted from the gyro signal 37 in subtractor 60, producing the desired RIN-reduced gyro signal.

Referring now to FIG. 8, analog signals are frequently processed through AC coupled amplifiers, as indicated in FIGS. 4 and 8 by DC Block 44, in which case the DC component of the analog signal, i.e., the gyro signal 37, is lost. The correct noise component amplitudes can be restored by multiplying a DC component with the RIN noise signal 35. This can be done by determining the magnitude of the DC component of the gyro signal 37 relative to the other spectral components of the gyro signal 37 using, for example, the modulation depth and rotation rate in the standard equation for a Sagnac interferometer. The process operates as follows for the embodiment 52c of FIG. 8: as in the embodiment of FIG. 7, the delayed RIN sample data 35 is first multiplied by the gyro signal 37 in multiplier 58b. In addition, a DC component kJO which has been suitably scaled in the manner described above, is multiplied with the delayed RIN noise 35 in multiplier 59 and added in adder 62 to the output signal derived from multiplier 58b. The amplitude (and phase) of the output signal of adder 62 are adjusted in variable gain amplifier 56b and subtracted from the gyro signal 37 in subtractor 60, producing the desired RIN-reduced gyro signal.

The noise 35 is preferably time-delayed first at delay unit 54, and then modulated by the sensor output signal 37, since otherwise the modulated noise in the subtracted signal will not have the correct time relationship. However, the two operations can be interchanged without producing a noticeable error if the demodulation is done narrow-band, such as in an open loop gyro. In this case, the bandwidth of the detector is small and only the fundamental frequency of the modulating signal is demodulated.

The resultant RIN-reduced gyro signal can be processed by any of the standard open or closed-loop processing methods known in the art. The gain of amplifiers 56a, 56b may be adjusted by comparing the noise powers in a frequency range which does not contain the gyro signal 37 and setting the noise powers in this frequency range to be equal.

In order for the timing to be correct, the coil length is restricted to lengths consistent with the sampling time interval, which is a function of the modulation frequency. This is normally not a significant constraint, and in some implementations, the modulation frequency could be changed to compensate for a specific required coil length. If this condition cannot be exactly satisfied, the degradation in performance is small if the time error itself is small compared to the inverse of the detector electronic bandwidth.

Figure 9:
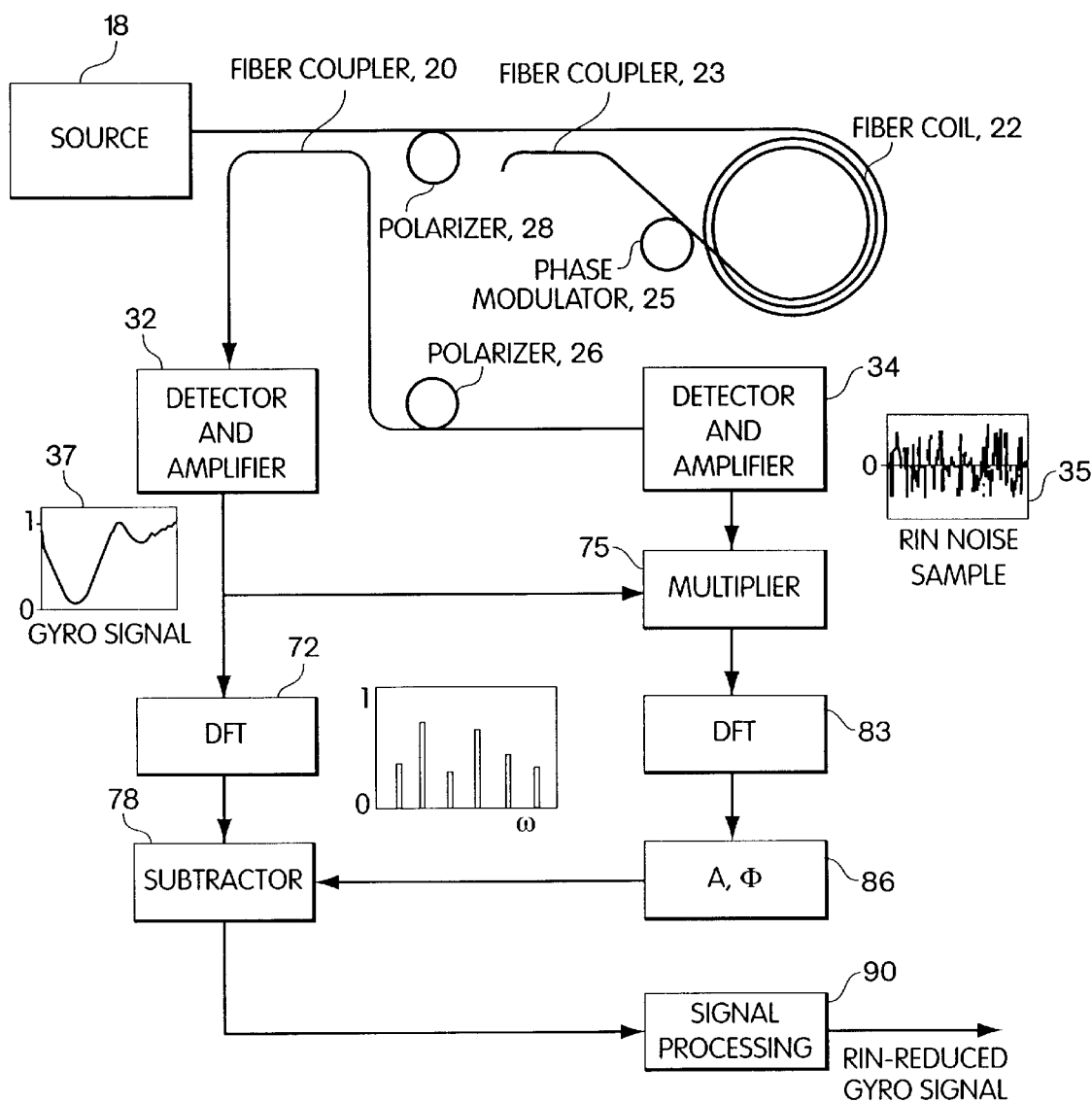
FIG. 9 shows a third embodiment of the fiber-optic sensor system according to the invention.

According to another embodiment illustrated in FIG. 9, the fiber-optic components are arranged in the same fashion as those of the first embodiment of FIG. 4, except that the fiber-optic sensor signal 37 and the RIN noise sample 35 are processed in the frequency domain instead of the time domain. The fiber-optic gyro signal 37 is detected by detector 32 and Fourier-transformed, for example, using a discrete Fourier transform (DFT) 72, to extract its spectral content. The RJN noise sample 35 is detected by detector 34 and is multiplied in multiplier 75 by the fiber-optic sensor signal 37, as described above, and then Fourier-transformed, for example, using a discrete Fourier transform (DFT) 83, in a similar manner as the fiber-optic sensor signal 37. Since only the RIN noise in the detection bandwidth of the fiber-optic sensor affects the signal-to-noise ratio, only the frequency corresponding to the modulation frequency need be computed. The result on the signal spectral bin of the RIN noise signal 35 is adjusted in amplitude and phase in variable gain amplifier 86, with a phase shift in the frequency domain corresponding to a time shift in the time domain described above. The resulting RIN noise signal in the frequency domain is then subtracted in subtractor 78 from the corresponding fiber-optic sensor signal 37 derived at the output of Fourier transform (DFT) 72, while still in complex format. The result can be further processed, for example, in a digital signal processor 90 in a manner identical to that of a fiber-optic sensor signal that had not been subject to RIN cancellation. For example, the output of signal processor 90 representing the RIN-reduced gyro signal may be integrated to reduce the bandwidth or converted to amplitude and sign.

A suitable amplitude and phase correction for the RIN noise can be determined in a number of ways. In one approach, a DFT is performed on both the fiber-optic sensor signal and the RIN signal in a spectral region where there is no fiber-optic sensor signal expected. That is to say, in an open-loop implementation, at a frequency which is not equal to the modulation frequency or a multiple thereof. Advantageously, a spectral weighting function may be applied to each of the signals to suppress spectral leakage of the fiber-optic sensor signals into the noise channels. A gain correction to be applied to at least one of the signal channels is equal to the ratio of the noise powers in the two channels, whereas the phase correction is the negative of the phase difference between the noise samples. In this analysis, it is assumed that the RIN component of the noise is sufficiently larger than other noise components, such as thermal and shot noise. Even if the RIN component is not the dominant noise contribution, the random nature of the other noise sources will reduce their influence as the averaging time for the comparison is increased.

Figure 10:
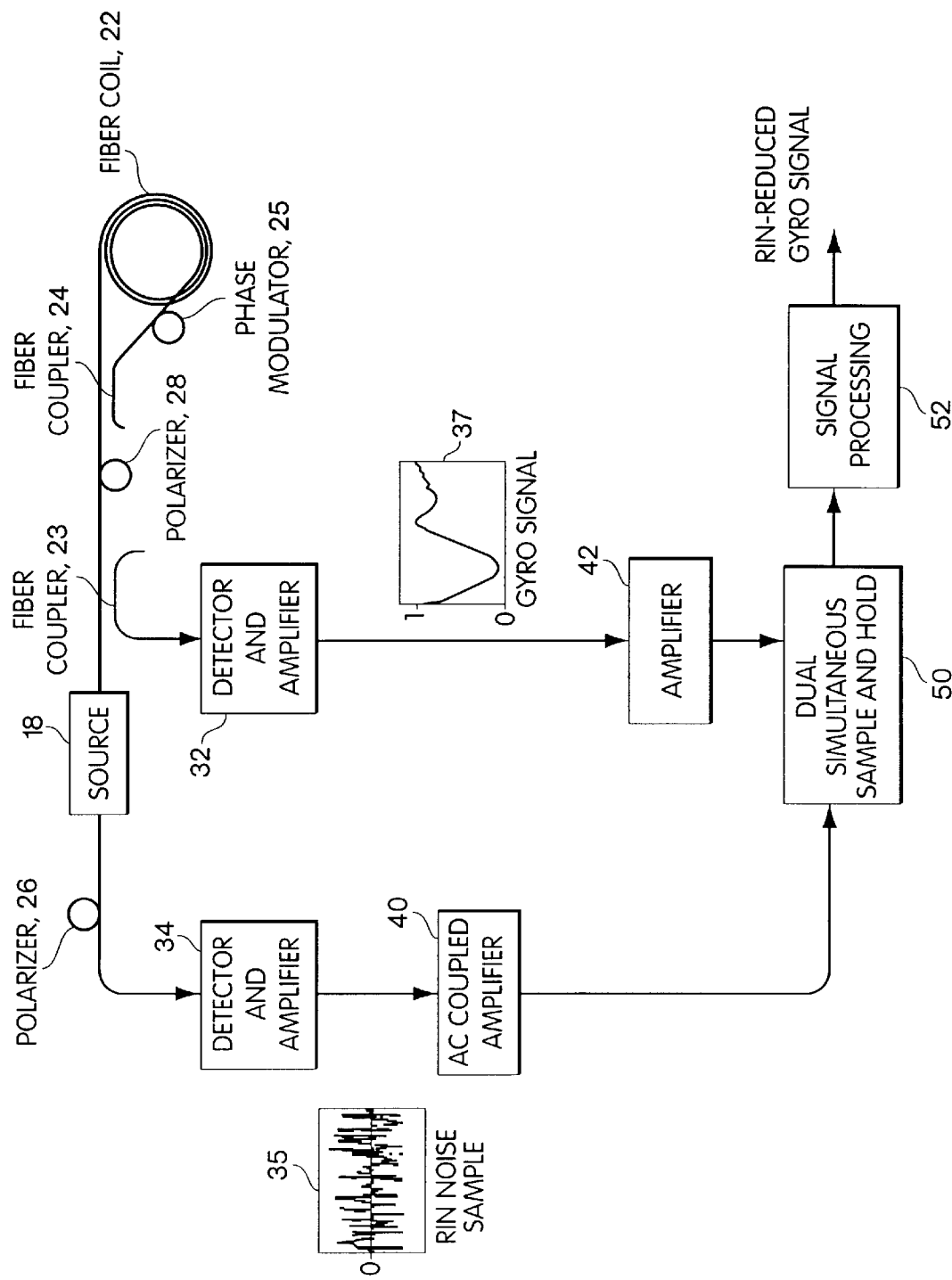
FIG. 10 shows a fourth embodiment of the fiber-optic sensor system according to the invention.
Figure 11:
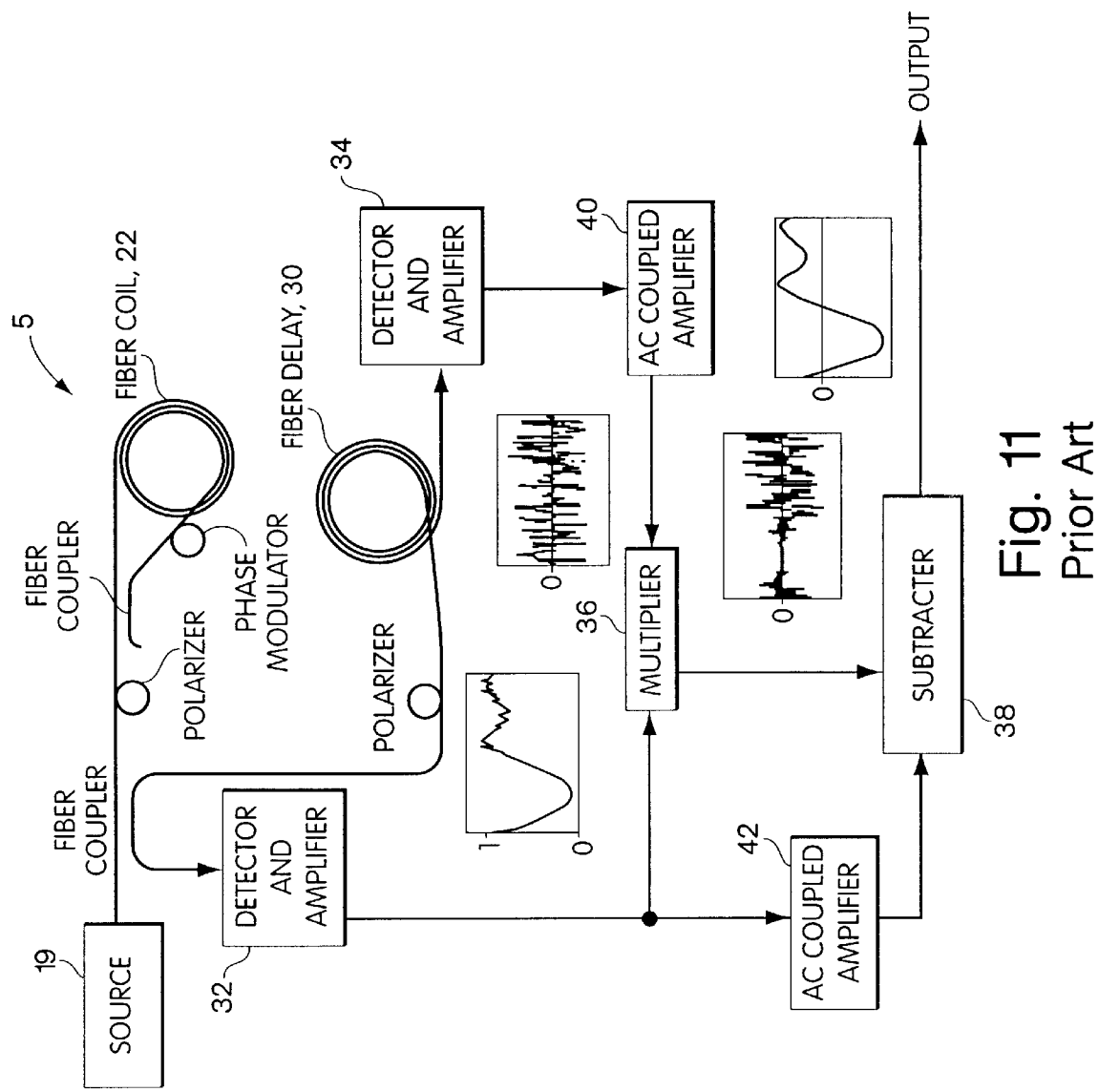
FIG. 11 shows a prior art current sensor.

According to yet another embodiment illustrated in FIG. 10, the fiber-optic components are arranged in the same fashion as those of the embodiment of FIG. 5, except that the RIN sample signal is sampled, for example, at a rear facet of the light source or laser 18 by detector 34 which is frequently incorporated to monitor the optical output power. This arrangement is best suited for application where the laser light is polarized. However, since the laser light is not likely to be polarized as well as light that has passed through a polarizer, the potential improvement in RIN is limited by the polarization of the laser source. Polarizer 26 may be employed if the laser light itself is not polarized.

While the invention has been disclosed in connection with the preferred embodiments shown and described in detail, various modifications and improvements thereon will become readily apparent to those skilled in the art. For example, the same noise reduction concept can also be applied to an interferometric fiber optic magnetic field and/or electric current sensor based on the Faraday effect which may be implemented as a continuous loop or in a reflective polarimetric configuration. In a current sensor, $\lambda/4$ wave plates are inserted between the source and the fiber coil to produce counter-propagating light beams with opposite circular polarization directions. These sensors can be analyzed in the same fashion as the interferometric fiber optic fiber-optic gyro, since the signal processing is analogous.

furthermore, the fiber optic sensors need not be implemented as fibers, but may be made of optical waveguides which may be formed on and/or integrated with a substrate.

Accordingly, the spirit and scope of the present invention is to be limited only by the following claims.

What is claimed is:

1. A fiber-optic sensor system for producing a fiber-optic sensor signal having reduced noise, comprising:
    a fiber-optic sensor adapted to receive a sensor input light and adapted to measure a physical quantity, with the fiber-optic sensor producing a sensor output signal corresponding to the physical quantity and a first noise component;
    a first detector which detects the sensor output signal;
    a second detector which detects the sensor input light corresponding to a second noise component; and
    an electronic processor coupled to the first and second detector, wherein the electronic processor includes
        a delay circuit which applies an electronic time delay to the second noise component, with the electronic time delay substantially corresponding to a time delay of the sensor input light traversing the fiber-optic sensor;
        a multiplier, which multiplies the time-delayed second noise component with the sensor output signal;
        an amplifier which amplifies the sensor output signal so as to suppress a DC component; and
        a subtractor which subtracts the multiplied time-delayed second noise component from the amplified sensor output signal to produce the fiber-optic sensor signal having the reduced noise.

2. The fiber-optic sensor system of claim 1, wherein the physical quantity is a rotation of the fiber-optic sensor.

3. The fiber-optic sensor system of claim 1, wherein the physical quantity is a magnetic field.

4. The fiber-optic sensor system of claim 3, wherein the magnetic field is produced by an electric current.

5. The fiber-optic sensor system of claim 1, wherein the electronic processor further includes an amplifier which adjusts at least one of an amplitude and a phase of the time-delayed second noise component.

6. The fiber-optic sensor system of claim 1, wherein the second detector is coupled to an input section of the fiber-optic sensor.

7. The fiber-optic sensor system of claim 1, wherein the second detector is coupled directly to the light source.

8. A fiber-optic sensor system for producing a fiber-optic sensor signal having reduced noise, comprising:
    a fiber-optic sensor adapted to receive a sensor input light and adapted to measure a physical quantity, with the fiber-optic sensor producing a sensor output signal corresponding to the physical quantity and a first noise component;
    a first detector which detects the sensor output signal;
    a second detector which detects the sensor input light corresponding to a second noise component; and
    an electronic processor coupled to the first and second detector, wherein the electronic processor includes
        a multiplier, which multiplies the second noise component with the sensor output signal;
        at least one transform processor which transforms the sensor output signal and the multiplied second noise component into the frequency domain;
        a delay circuit which applies an electronic time delay to the transformed multiplied second noise component, by phase-shifting the transformed multiplied second noise component in the frequency domain relative to the transformed sensor output signal with the electronic time delay substantially corresponding to a time delay of the sensor input light traversing the fiber-optic sensor; and
        a subtractor which subtracts the time-delayed transformed multiplied second noise component from the transformed sensor output signal to produce the fiber-optic sensor signal having reduced noise.

9. The fiber-optic sensor system of claim 8, wherein the transform processor is a Fourier-transform processor.

10. The fiber-optic sensor system of claim 8, wherein the physical quantity is a rotation of the fiber-optic sensor.

11. The fiber-optic sensor system of claim 8, wherein the physical quantity is a magnetic field.

12. The fiber-optic sensor system of claim 11, wherein the magnetic field is produced by an electric current.

13. The fiber-optic sensor system of claim 8, wherein the electronic processor further includes an amplifier which adjusts an amplitude and a phase of the transformed, multiplied second noise component.

14. The fiber-optic sensor system of claim 8, wherein the second detector is coupled to an input section of the fiber-optic sensor.

15. The fiber-optic sensor system of claim 8, wherein the second detector is coupled directly to the light source.

16. A method of producing a measurement signal having reduced noise from a fiberoptic sensor, comprising:
   measuring a sensor output signal containing the measurement signal and a first noise component;
   measuring an input light noise component of fiber-optic sensor input light representing a second noise component;
   multiplying the second noise component with the sensor output signal;
   transforming the sensor output signal and the multiplied second noise component into the frequency domain;
   adjusting an amplitude and a phase of the transformed multiplied second noise component relative to a respective amplitude and phase of the transformed sensor output signal, so that the relative phase shift comprises the time delay of the sensor output signal traversing the fiber optic sensor; and
   subtracting the time-delayed transformed multiplied second noise component from the transformed sensor output signal to produce the reduced noise measurement signal.

17. The method according to claim 16, wherein the amplitude and phase adjustments are determined by comparing the sensor output signal and the second noise component in a spectral region where no measurement signal is produced by the fiber-optic sensor.

18. The method according to claim 17, wherein a relative gain correction is applied to at least one of the transformed sensor output signal and the transformed multiplied second noise component, wherein the relative gain correction is equal to a ratio of the noise powers of the sensor output signal and the second noise component and wherein the phase correction is the negative of the phase difference between the first noise component and the second noise component.

19. The method according to claim 16, wherein a spectral weighting function is applied to the transformed sensor output signal and the transformed multiplied second noise component.

20. An optical sensor system for producing a sensor signal having reduced noise, comprising:
   a light source producing a sensor input light;
   an optical sensor receiving the sensor input light and adapted to measure a physical quantity, with the optical sensor producing a sensor output signal comprising the physical quantity and a first noise component;
   a first detector which detects the sensor output signal;
   a second detector which detects the sensor input light comprising a second noise component; and
   an electronic processor coupled to the first and second detector, wherein the electronic processor electronically time-delays the second noise component with respect to the sensor output signal, with the electronic time delay substantially corresponding to a time delay of the sensor input light traversing the optical sensor, and subtracts a modulated signal, which is a function of the time-delayed second noise component multiplied by the sensor output signal, from the sensor output signal to produce the sensor signal having the reduced noise.

21. The optical sensor system of claim 20, wherein the optical sensor comprises an optical waveguide.

22. The optical sensor system of claim 21, wherein the optical waveguide is an integrated optical waveguide.

23. The optical sensor system of claim 20, wherein the modulated signal is produced by multiplication of the time-delayed second noise component and the sensor output signal.

24. A fiber-optic sensor system for producing a fiber-optic sensor signal having reduced noise, comprising:
   a fiber-optic sensor adapted to receive a sensor input light and adapted to measure a physical quantity, with the fiber-optic sensor producing a sensor output signal corresponding to the physical quantity and a first noise component;
   a first detector which detects the sensor output signal;
   a second detector which detects the sensor input light corresponding to a second noise component; and
   an electronic processor coupled to the first and second detector, wherein the electronic processor includes
      a sample-and-hold device which samples the sensor output signal and the second noise component at common sampling times;
      a delay circuit which applies an electronic time delay of a number of sampling times to the sampled-and-held second noise component relative to the sampled-and-held sensor output signal, with the electronic time delay substantially corresponding to a time delay of the sensor input light traversing the fiber-optic sensor;
      an amplifier which adjusts at least one of an amplitude and a phase of the time-delayed sampled-and-held second noise component;
      a multiplier, which multiplies the amplified, time-delayed sampled-and-held second noise component with the sampled-and-held sensor output signal; and
      a subtractor which subtracts the multiplied, amplified, time-delayed sampled-and-held second noise component from the sampled-and-held sensor output signal to produce the fiber-optic sensor signal having the reduced noise.

25. A fiber-optic sensor system for producing a fiber-optic sensor signal having reduced noise, comprising:
   a fiber-optic sensor adapted to receive a sensor input light and adapted to measure a physical quantity, with the fiber-optic sensor producing a sensor output signal corresponding to the physical quantity and a first noise component;
   a first detector which detects the sensor output signal;
   a second detector which detects the sensor input light corresponding to a second noise component; and
   an electronic processor coupled to the first and second detector, wherein the electronic processor includes
      a sample-and-hold device which samples the sensor output signal and the second noise component at common sampling times;
      a delay circuit which applies an electronic time delay of a number of sampling times to the sampled-and-held second noise component relative to the sampled-and-held sensor output signal, with the electronic time delay substantially corresponding to a time delay of the sensor input light traversing the fiber-optic sensor;
      a multiplier, which multiplies the time-delayed sampled-and-held second noise component with the sampled-and-held sensor output signal;
      an amplifier which adjusts at least one of an amplitude and a phase of the multiplied time-delayed sampled-and-held second noise component; and
      a subtractor which subtracts the amplified, multiplied time-delayed sampled-and-held second noise component from the sampled-and-held sensor output signal to produce the fiber-optic sensor signal having the reduced noise.

26. A fiber-optic sensor system for producing a fiber-optic sensor signal having reduced noise, comprising:

a fiber-optic sensor adapted to receive a sensor input light and adapted to measure a physical quantity, with the fiber-optic sensor producing a sensor output signal corresponding to the physical quantity and a first noise component;

a first detector which detects the sensor output signal;

a second detector which detects the sensor input light corresponding to a second noise component; and an electronic processor coupled to the first and second detector, wherein the electronic processor includes an amplifier which amplifies the sensor output signal so as to suppress a DC component;

a sample-and-hold device which samples the amplified sensor output signal and the second noise component at common sampling times;

a delay circuit which applies an electronic time delay of a number of sampling times to the sampled-and-held second noise component relative to the sampled-and-held amplified sensor output signal, with the electronic time delay substantially corresponding to a time delay of the sensor input light traversing the fiber-optic sensor;

a first multiplier, which multiplies the time-delayed sampled-and-held second noise component with the sampled-and-held amplified sensor output signal;

a second multiplier, which multiplies the time-delayed sampled-and-held second noise component with the suppressed DC component of the sensor output signal;

an adder, which adds the time-delayed sampled-and-held second noise component that had been multiplied with the sampled-and-held amplified sensor output signal, and the time-delayed sampled-and-held second noise component that had been multiplied with the suppressed DC component of the sensor output signal;

an amplifier which adjusts at least one of an amplitude and a phase of the added, multiplied time-delayed sampled-and-held second noise component; and a subtractor which subtracts the amplified, added, multiplied time-delayed sampled-and-held second noise component from the sampled-and-held amplified sensor output signal to produce the fiber-optic sensor signal having the reduced noise.

27. A method of producing a measurement signal having reduced noise from a fiber-optic sensor, comprising:

measuring a sensor output signal containing the measurement signal and a first noise component;

measuring an input light noise component of fiber-optic sensor input light representing a second noise component;

electronically time-delaying the second noise component, with the time delay substantially corresponding to a sensor time delay of the sensor input light traversing the fiber-optic sensor;

multiplying the time-delayed second noise component with the sensor output signal;

adjusting an amplitude and optionally a phase of the multiplied time-delayed second noise component relative to a respective amplitude and optionally a phase of the sensor output signal by comparing the multiplied second noise component and the sensor output signal in a spectral region where no measurement signal is produced by the fiber optic sensor; and subtracting the adjusted multiplied time-delayed second noise component from the sensor output signal to produce the reduced noise measurement signal.

* * * * *